(12) United States Patent
Adlmaninger et al.

(10) Patent No.: US 12,078,133 B2
(45) Date of Patent: Sep. 3, 2024

(54) MOTORCYCLE WITH AN INTERNAL COMBUSTION ENGINE, WITH AN AIR DUCT DEVICE FOR THE INTERNAL COMBUSTION ENGINE, WITH A SIDE PANEL AND WITH A REAR FRAME

(71) Applicant: KTM AG, Mattighofen (AT)

(72) Inventors: Julia Adlmaninger, Helpfau-Uttendorf (AT); Marco Hubmann, Judenburg (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 18/092,364

(22) Filed: Jan. 2, 2023

(65) Prior Publication Data

US 2024/0218849 A1  Jul. 4, 2024

(51) Int. Cl.
| | | |
|---|---|---|
| *F02M 35/04* | (2006.01) | |
| *B62J 40/10* | (2020.01) | |
| *F02M 35/02* | (2006.01) | |
| *F02M 35/10* | (2006.01) | |
| *F02M 35/16* | (2006.01) | |

(52) U.S. Cl.
CPC ............ *F02M 35/048* (2013.01); *B62J 40/10* (2020.02); *F02M 35/0204* (2013.01); *F02M 35/10144* (2013.01); *F02M 35/162* (2013.01)

(58) Field of Classification Search
CPC ............. F02M 35/048; F02M 35/0204; F02M 35/10144; F02M 35/162; F02M 35/02416; B62J 40/10
See application file for complete search history.

(56) References Cited

U.S. PATENT DOCUMENTS

| | | | |
|---|---|---|---|
| 2013/0240276 A1* | 9/2013 | Matsushima | F02M 35/10091 180/68.3 |
| 2018/0072368 A1* | 3/2018 | Matsuo | B62K 11/02 |
| 2020/0238819 A1* | 7/2020 | Tani | F01N 1/02 |

* cited by examiner

*Primary Examiner* — Syed O Hasan
(74) *Attorney, Agent, or Firm* — Rod D. Baker (57) ABSTRACT

A motorcycle (1) is proposed in which a grip opening (29) forms a part of the flow path of the intake air of the engine (2). This grip opening (29) is formed by gaps (5) in the side spoilers (3, 19) and a recess (8) in the rear frame (6). Arranged at the recess (8) are the air inlet openings (11, 12, 13, 31, 32) of the air guidance device (9) in which the air filter element (7) for cleaning the intake air of the engine (2) is located.

8 Claims, 11 Drawing Sheets

MOTORCYCLE WITH AN INTERNAL COMBUSTION ENGINE, WITH AN AIR DUCT DEVICE FOR THE INTERNAL COMBUSTION ENGINE, WITH A SIDE PANEL AND WITH A REAR FRAME

BACKGROUND OF THE INVENTION

The present invention relates to a motorcycle having an internal combustion engine and an air intake device for the internal combustion engine, with an air guidance device guiding intake air for combustion in the direction of an air filter element, which is formed with side spoilers of the motorcycle, with a holding device holding the air filter element, with a rear cover element which forms a fender of the motorcycle, and with sections of the motorcycle frame. The invention also relates to an air guidance device, a side spoiler and a rear frame of such a motorcycle.

Such an air guidance device formed with parts arranged on the motorcycle enables a housing for the air guidance device to be dispensed with. This means that weight can be reduced.

Based on a motorcycle attributable to the applicant, a generic motorcycle has become known, as described above and in which provision is made for an opening in the left-hand side spoiler or panel which enables air to enter into the air guidance device. This opening may be configured as a slot running in a vertical direction which, when a user is sitting on a seat of the known motorcycle, is to be found arranged behind the user in the direction of travel of the motorcycle and at a clear distance underneath the seat when viewed in the direction of the vertical axis of the motorcycle.

Although this configuration has already proven to be successful, there is still room for improvement. For example, this opening is made on a side of the spoiler located in the direction of travel. This increases the structural width of the motorcycle and the air resistance of the motorcycle.

It has been shown in the known motorcycle that, in certain riding situations, from a sitting position on the motorcycle, the user sees the need to ride the vehicle standing upright on the footrests. In this posture, the protective clothing of the user of the motorcycle may cover the slot running in a vertical direction. The air supply into the air intake device is therefore restricted, influencing the performance of the internal combustion engine.

Finally, when cleaning the motorcycle with water or similarly when riding off-road, spray and/or dirt particles may get into the air intake device. The air filter element must then be cleaned if dirt particles and water have accumulated in the air filter element.

Starting on this basis, the problem which the present invention seeks to solve is equipping the known motorcycle with improved air supply which, in particular, contributes to solving the problems described above.

To solve this problem in relation to the motorcycle, the invention has the features specified in the several claims.

SUMMARY OF THE INVENTION

The invention creates a motorcycle having an internal combustion engine and an air intake device for the internal combustion engine, with an air guidance device guiding intake air for combustion in the direction of an air filter element in which an air filter element is arranged and which is formed with side spoilers of the motorcycle, with a holding device holding the air filter element, with a rear cover element which forms a fender or mudguard of the motorcycle, and with sections of the motorcycle frame having a rear frame, wherein at least one air inlet opening of the air guidance device of the motorcycle is arranged at a recess of a rear frame of the motorcycle, and wherein the recess is arranged transversely to the direction of travel and penetrates right through the rear frame, wherein the at least one air inlet opening is arranged transversely to the direction of travel behind gaps in the side spoilers and at the same height as or lower than the upper edge of the side spoiler at the respective gap and the recess and the gaps are shaped as a grip opening for the user of the motorcycle according to the invention.

BRIEF DESCRIPTION OF THE VIEWS OF THE DRAWING

The invention is explained in more detail below by reference to the drawings, in which.

DETAILED DESCRIPTION OF THE INVENTION

The internal combustion engine of the motorcycle according to the invention requires an air supply which is provided by an air guidance device in a motorcycle according to the invention. This air guidance device is formed from the specified components of the motorcycle. For example, an independent or separate housing for this air guidance device can be dispensed with. This is desirable for reasons of saving weight. Particularly when the motorcycle is used off-road (motocross, enduro), an air filter is needed to stop water, dust and dirt from getting into the combustion chamber of the internal combustion engine.

The direction of travel means the direction in which the motorcycle is moving when travelling straight ahead. The terms "front" and "rear" are defined in relation to this direction of travel. The vertical direction means a direction opposite to the direction of gravitational force. "Horizontal" means any direction perpendicular to the direction of gravitational force. The terms "over", "under", "above" "below", "height", "deep", "top side", "underside", "upper edge" and "lower edge" are defined in relation to this vertical direction when the motorcycle is arranged standing upright on a horizontal surface. The transverse direction means a direction running horizontally and perpendicularly to the direction of travel. In a motorcycle with two wheels, one of the vertical direction and the line connecting the points of contact of the motorcycle tyres with the surface when the handlebars are in the straight-on position is defined as the longitudinal median plane.

The rear frame is a component of the motorcycle frame which is located on the motorcycle substantially underneath the seat and above the rear wheel swing arm.

In the configuration described above, the air inlet openings can be arranged on the air guidance device well protected from dirt and spray since the air enters the air guidance device from above. Through a grip opening formed by the gaps in the side spoilers and the recess in the rear frame, air flows in a horizontal direction transversely to the direction of travel to the upper part of the air guidance device and is sucked downwards at the air inlet openings.

Additional protection is achieved by the air inlet openings being able to be arranged very close to the longitudinal median plane of the vehicle since they are located in the grip opening penetrating right through the motorcycle close to longitudinal median plane. Further protection is achieved by the side spoilers being mounted at the same height as or higher than the region of the rear frame on which the air inlet openings are located. Such protection from dirt and spray is particularly necessary when the motorcycle is being used off-road.

The motorcycle according to the invention has a grip opening accessible from both sides of the vehicle through the gaps in the side spoilers and the recess in the rear frame which may advantageously be used, for example, to stand the motorcycle back up after a crash or quite simply to steer the motorcycle when pushing the motorcycle, or else to lift the motorcycle up by using the gripping device as a handle. So that this grip opening coincides with the top side of the air guidance device on its underside, it is possible to provide air inlet openings for the air required for combustion very close to the longitudinal median plane of the vehicle. These air inlet openings are therefore further away from the right-hand and left-hand external sides of the motorcycle than was the case in a known motorcycle.

Such a protected arrangement of the air inlet openings enables the air inlet openings to be configured to be larger than the configuration described at the beginning as is used on a known motorcycle. This also ensures that the internal combustion engine responds quickly to a delivery of torque by the internal combustion engine requested by the user by opening a throttle valve device of the internal combustion engine according to the invention because the air guidance device according to the invention enables a larger quantity of air to be supplied to the internal combustion engine. The surface of the air inlet openings may be configured to be more than twice as large as those of known motorcycles.

A virtual wind tunnel was simulated in a computational fluid dynamics (CFD) model in which an air flow travelling at a speed of 70 km/h flowed towards the motorcycle according to the invention being manned by a rider. The inflow of air for the engine was set at a rotational speed of 7000 rpm for the simulation. It was discovered in this simulation that, under said conditions, flow conditions arise which cause excess pressure in the air guidance device. This represents a clear improvement compared to a known motorcycle. In some embodiments, the air inlet openings are arranged in the rear frame in a part of the rear frame consisting of plastic.

Rear frames often consist of a number of components, some of which are made of metal and others of plastic. The positioning of the air inlet openings on a part of the rear frame consisting of plastic enables this part of the rear frame to be made without machining, such as drilling. The position of the air inlet openings is also more easily variable during construction for plastic parts than for metal parts since, in the case of plastic parts, there are regions which are put under only slight static and dynamic strain.

The invention also creates an air guidance device in a motorcycle described above, wherein the air filter element is arranged in the air guidance device, the air guidance device being formed with side spoilers of the motorcycle, a holding device holding the air filter element, a rear cover element which forms a fender of the motorcycle, and sections of the motorcycle frame having a rear frame, wherein at least one air inlet opening of the air guidance device of the motorcycle is arranged on a rear frame of the motorcycle in a part of the rear frame, and wherein the recess is arranged transversely to the direction of travel and penetrates right through the rear frame, and the at least one air inlet opening is arranged on the air guidance device such that a shortest and straightest possible connection is formed between the air inlet opening and an inlet surface of the air filter element.

In a known motorcycle, the air inlet opening or air inlet openings are mounted on a side spoiler of the motorcycle.

Since they are supposed to take the largest possible quantity of air, such air inlet openings are opened substantially forwards in the direction of travel. The air filter element is mounted on the front side of the air guidance device and is therefore located in front of the air inlet openings when viewed in the direction of travel. This means that the air which flows in the direction of travel when it enters the air guidance device has to change its direction by 180° in order to reach the air filter element. This change of direction of the air flow makes the supply of air more difficult because turbulence when it changes direction reduces the speed of flow and the air flow.

In the configuration according to the invention, on the other hand, the air inlet openings are located behind on the top side of the air guidance device. Air flows to these air inlet openings transversely to the direction of travel since the air inlet openings are arranged very close to the longitudinal median plane of the motorcycle. As a result, a larger air mass flow is provided for the internal combustion engine of the motorcycle according to the invention.

In some embodiments, the air guidance device is organized such that the recess in the rear frame is arranged behind gaps in the side spoiler when viewed transversely to the direction of travel and such that a flow path of air taken in from the gap through the recess to the at least one air inlet opening is curved.

This configuration, with air inlet openings arranged behind the side spoilers in a part of the rear frame, offers the advantage that dirt particles and water droplets preferably precipitate out of the air flow at curves in the flow path. As a result of the fact that the direction of the air flow changes by less than 90° at all levels here, on the one hand, the supply of air is made less difficult than in earlier models. On the other hand, dirt particles and water droplets already precipitate out of the air flow outside the air guidance device if first deviations from the straight proliferation of the air flow already take place before the air flow reaches the air inlet openings and the air guidance device. The accrual of dirt particles and water droplets in the collection regions of the air guidance device and on the air filter element is thereby reduced. The air guidance device and the air filter element therefore no longer need to be cleaned so often.

In some embodiments, the air guidance device has an outlet opening for water and particulates at the lowest point when viewed vertically.

Such an outlet opening enables water and particulates up to a certain size to leave the air guidance device again without any external influence. The interval between cleaning the air filter element and the air guidance device can also thereby be extended.

The invention also creates a rear frame in a motorcycle described above which is arranged on an air guidance device of the motorcycle described above, the rear frame having a recess which is arranged transversely to the direction of travel and penetrates right through the rear frame, forming a grip opening together with side spoilers and at least one air inlet opening being arranged at the recess.

Finally, the invention creates a side spoiler in a motorcycle described above which is mounted on a frame of the motorcycle having a rear frame described above, wherein the side spoiler has a gap and the side spoiler has an edge region which protrudes into the recess on the underside of the recess.

This configuration of the side spoiler enables the side spoiler to be used to steer the air flow towards the air inlet openings. Such a shape of the side spoiler makes it even more unlikely that a user will catch their hand or glove on the side spoiler if they have stood the motorcycle up or lifted it up and remove their hand from the grip opening again.

In some embodiments, the side spoiler described above is configured in multiple parts. This enables easy assembly of the side spoiler.

Figure 1:
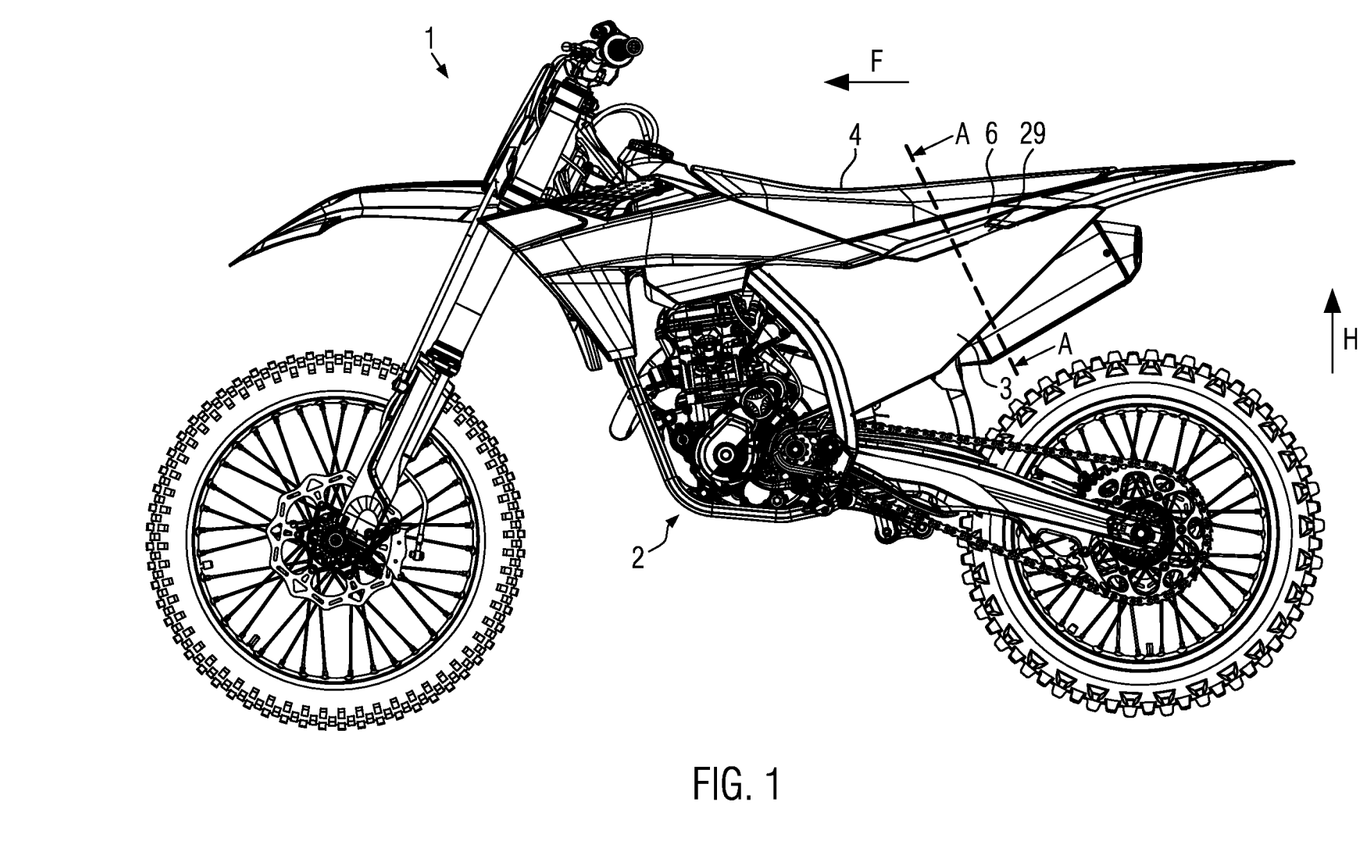
FIG. 1 shows a side view of the motorcycle according to the invention.

FIG. 1 of the drawings shows a side view of a motorcycle 1 according to the present invention. Clearly recognizable are the internal combustion engine 2 also referred to as the engine, a left-hand side spoiler 3, a seat 4 also referred to as a saddle, a section of the rear frame 6 reaching as far as the outside of the motorcycle and a grip opening 29. Arrows are used to show the direction of travel F and the vertical direction H. Reference is made below to section plane A.

Figure 2:
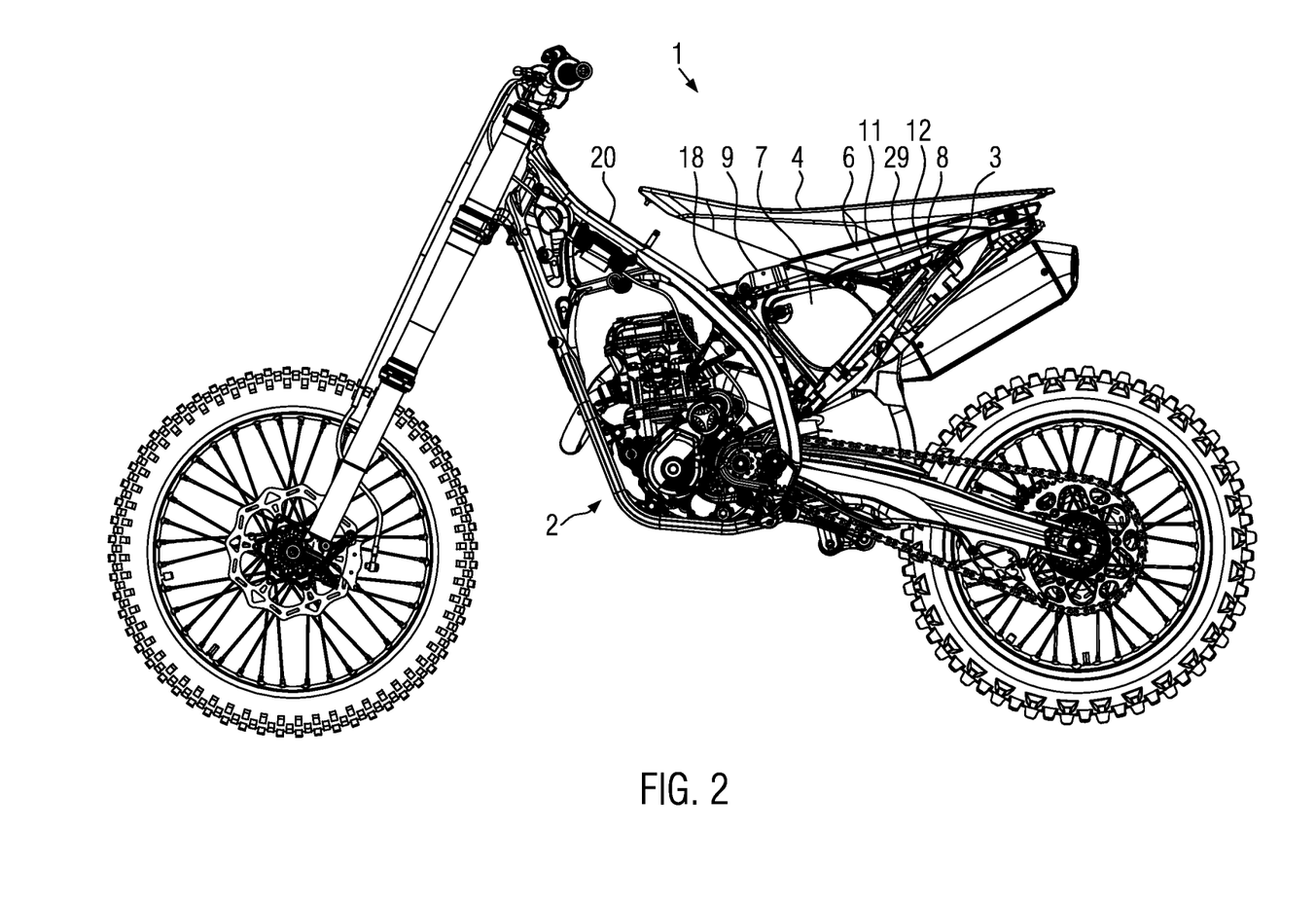
FIG. 2 shows a further side view of the motorcycle without a spoiler.

FIG. 2 shows the same motorcycle 1 as FIG. 1. However, a part of the side spoiler 3 has been removed here. Other parts of the motorcycle are not shown here either. The inside of the air guidance device 9 can be seen behind the side spoiler. Clearly recognizable are the frame 20 of the motorcycle 1, the holding device 18 for the air filter 7, the air filter element 7 itself, further sections of the rear frame 6 and the recess 8 in the rear frame 6 which coincides with the grip opening 29 in this illustration. Also recognizable are two air inlet openings 11 and 12.

Figure 3:
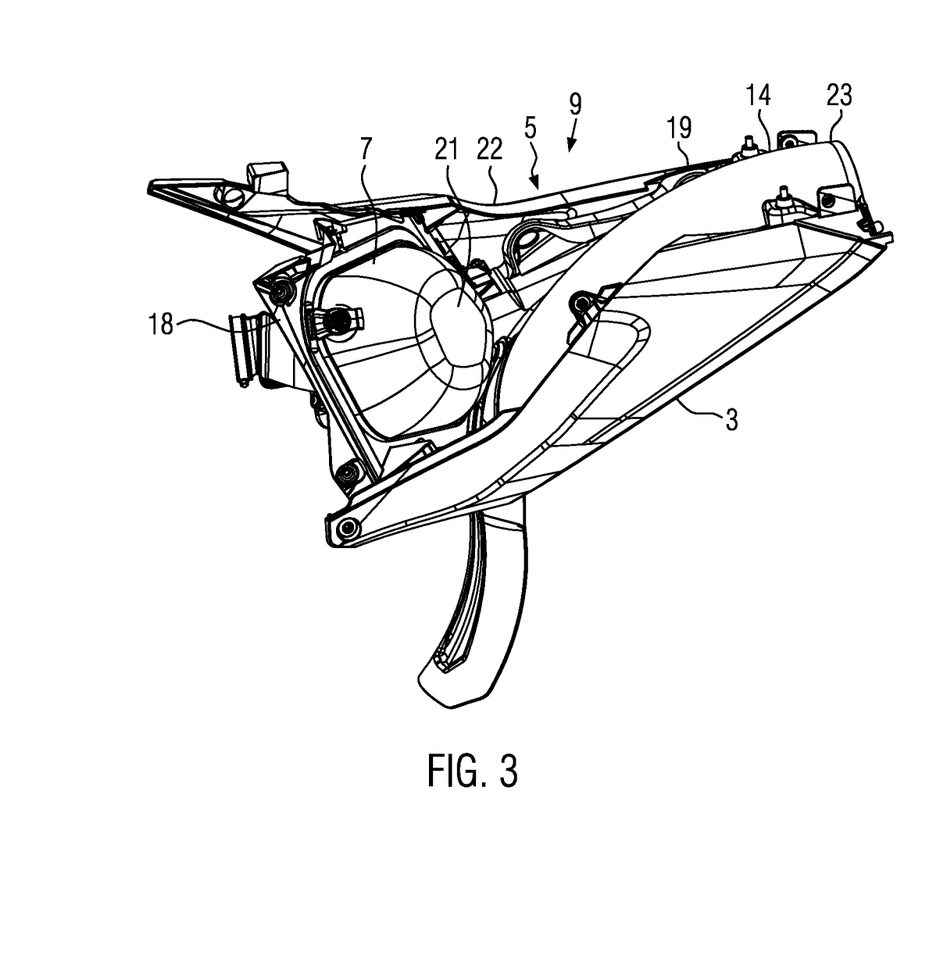
FIG. 3 shows a view of elements of the air guidance device from diagonally above.

FIG. 3 is a view into the inside of the air guidance device 9 from diagonally left above. The same reference numerals relate to the same structural elements as in the previous and further figures. The air inlet surface 21 is clearly recognizable on the air filter 7. It extends over the entire dome-shaped region of the surface of the air filter 7. In addition to the right-hand side spoiler 3, the rear cover element 23 which forms a fender 14 is also recognizable. From this perspective, the right-hand side spoiler 19 with the gap 5 can also be seen. The edge region 22 of this gap 5 is drawn inwards in the direction of the rear frame 6 not shown in this figure.

Figure 6:
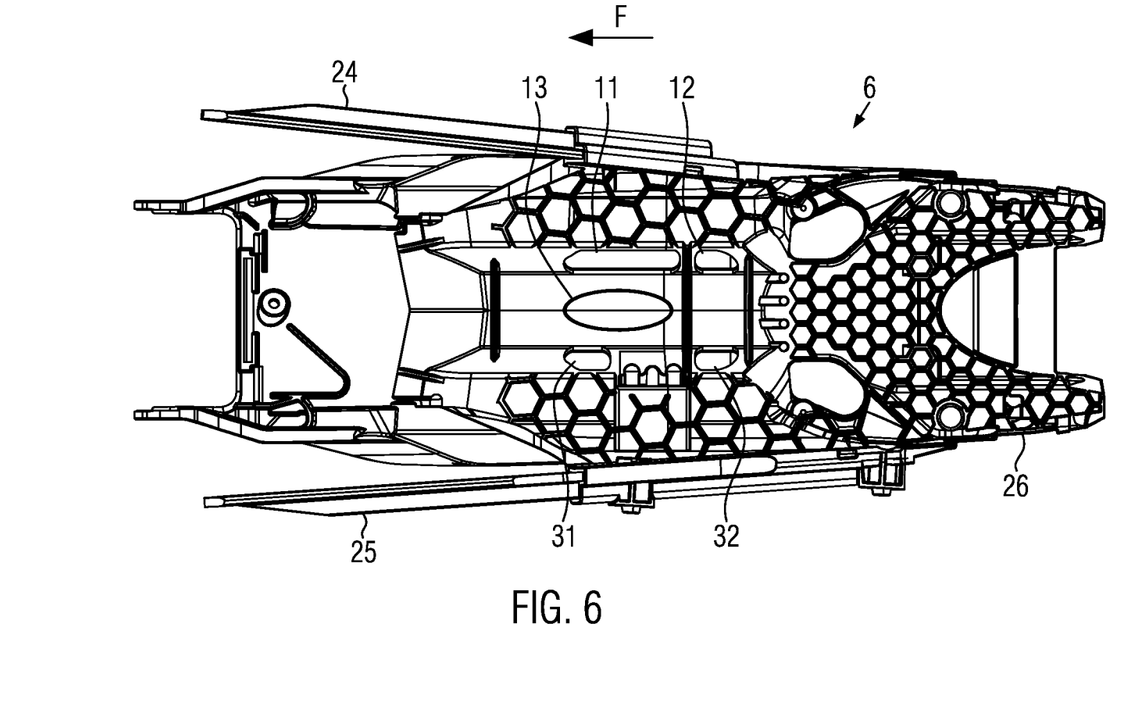
FIG. 6 shows an illustration of the rear frame viewed from underneath.

FIG. 6 shows the rear frame 6 in a view from underneath, that is to say from inside the air guidance device 9. The part 26 of the rear frame provided with a honeycomb structure consists of plastic here, whilst, for example, the longitudinal struts 24 and 25 are made of metal. The rear frame therefore represents a composite component. Clearly recognizable are five air inlet openings 11, 12, 13, 31 and 32 provided on the rear frame 6. The air inlet opening 13 is shaped similarly to an ellipse here and arranged on a horizontal surface of the part 26 of the rear frame 6 consisting of plastic. This horizontal surface also forms the underside of the recess 8. The four air inlet openings 11, 12, 31 and 32, on the other hand, are arranged on two surfaces of the part 26 of the rear frame 6 consisting of plastic sloping downwards when viewed vertically.

Figure 7:
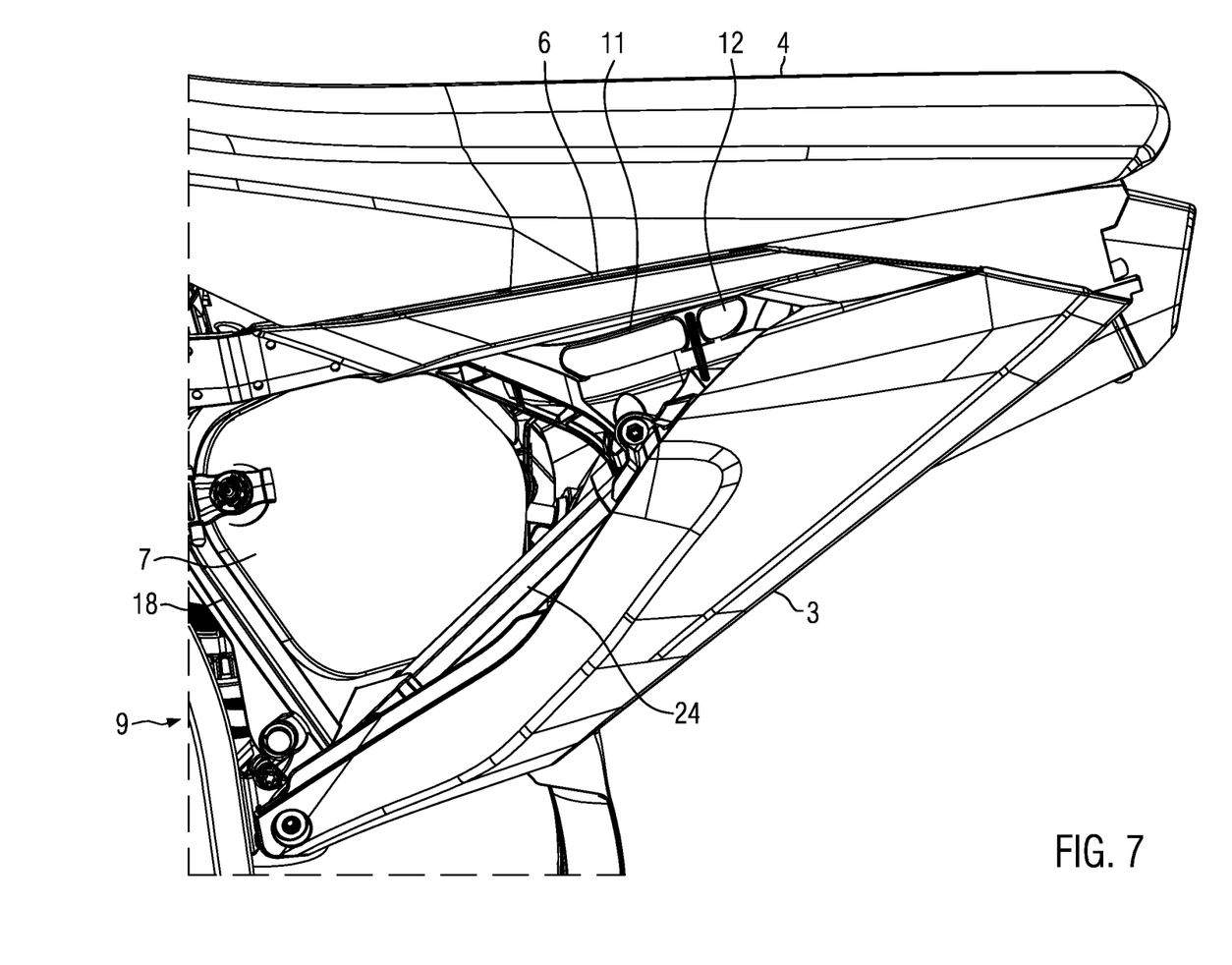
FIG. 7 shows a further view of elements of the air guidance device from diagonally above.

FIG. 7 shows a view of the left-hand side of the air guidance device 9 in which a part of the side spoiler 3 has been removed. The air filter element 7, the holding device 18, the left-hand longitudinal strut 24 of the rear frame 6 and the air inlet openings 11 and 12 in the rear frame are thereby recognized inside the air guidance device 9.

Figure 8:
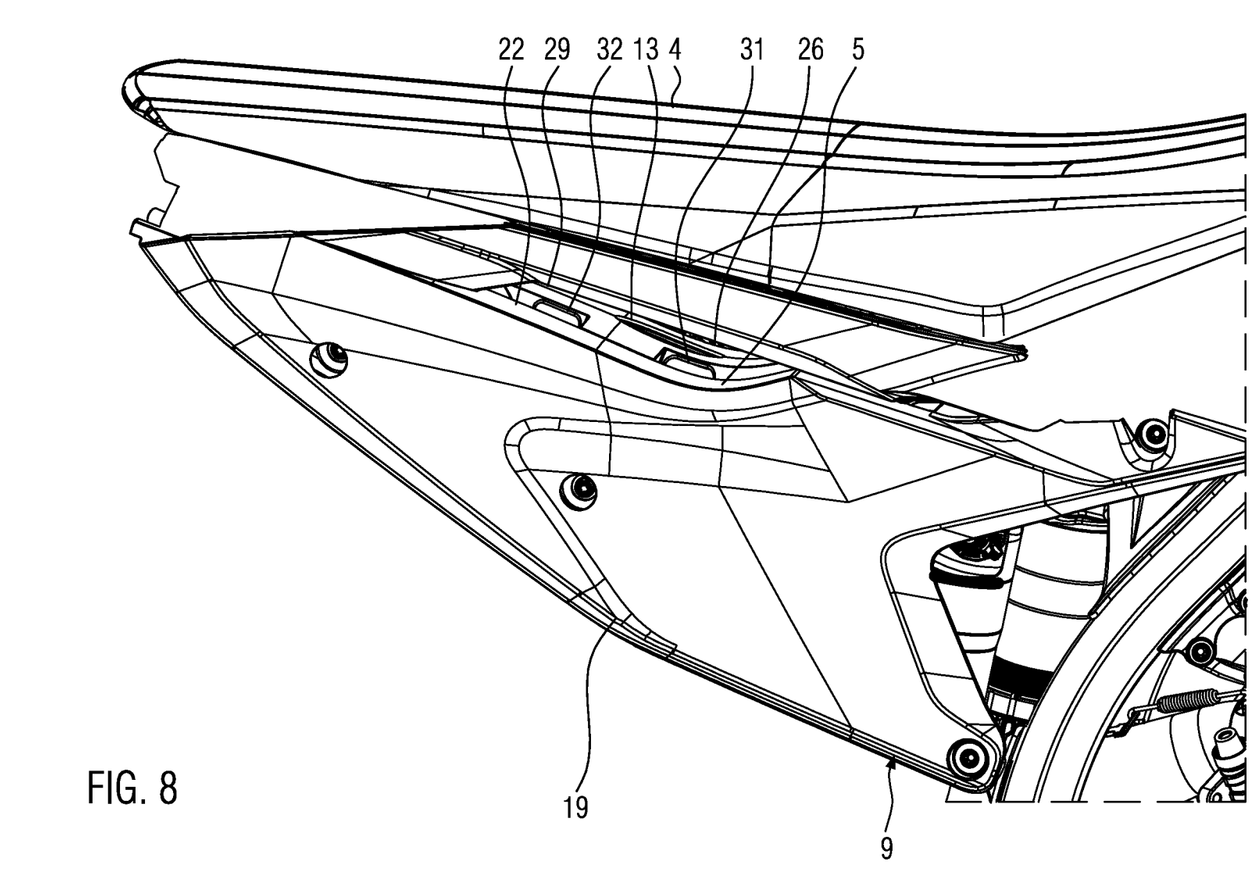
FIG. 8 shows a view of the air guidance device from the right-hand side.

FIG. 8 is an illustration of the air guidance device 9 in which the perspective of the viewer is raised slightly in respect of the underside of the grip opening 29. The air inlet openings 31 and 32 can therefore be seen, as can the top side 22 of the inwardly bent edge region of the gap 5 which is also shown in FIG. 3.

In order to form this gap 5, the edge region 22 is configured such that it is drawn upwards in its part located at the front in the direction of travel. The right-hand side spoiler 19 with a defined clearance on the section of the rear frame 6 reaching outwards lies at the front end of this edge region 22. The gap 5 is produced by the fact that the distance between the rear frame 6 and the edge region 22 is much greater in a region located further behind than this defined clearance. As a result, the grip opening 29 is formed from the recess 8 in the part 26 of the rear frame 6 made of plastic and the gap 5 in the side spoiler 19.

FIGS. 4, 5, 9 and 10 serve to illustrate the air flows in the air guidance device 9.

Figure 4:
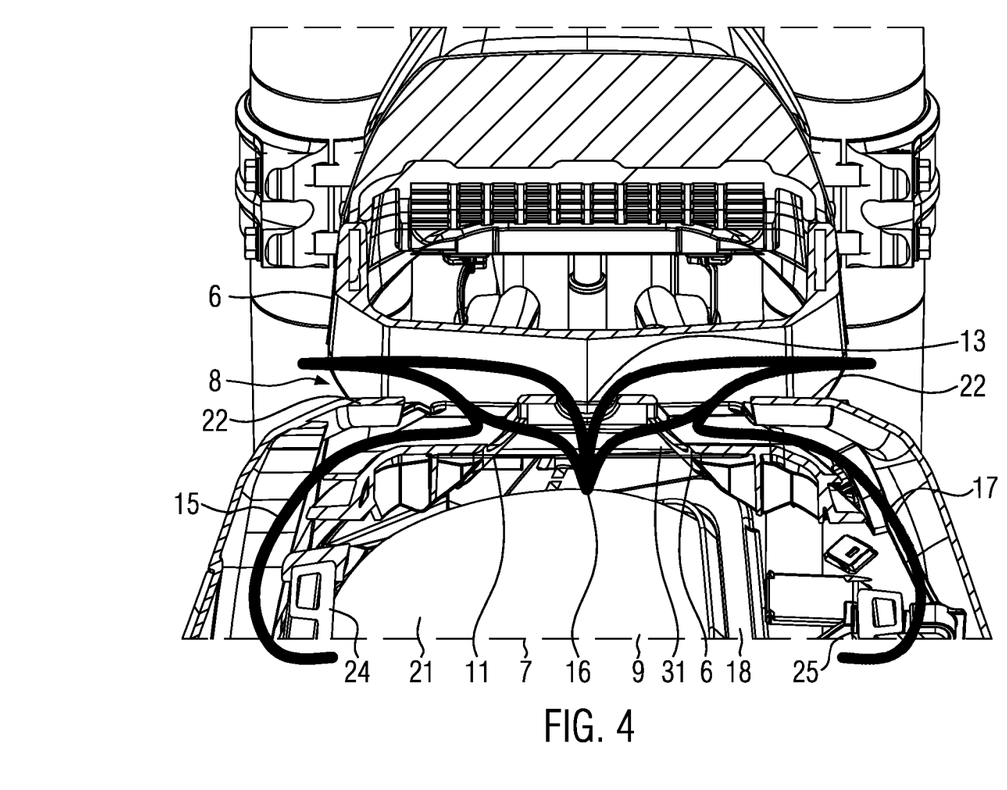
FIG. 4 shows a schematic illustration in cross section to explain the guidance of the intake air in the motorcycle and in the air guidance device.

FIG. 4 is an illustration in cross section through the motorcycle 1 along the section plane A-A shown in FIG. 1. The air inlet openings 11, 13 and 31 are clearly recognizable in the lower region of the rear frame 6. Through the recess 8 in the rear frame 6, air flows indicated by 15, 16 and 17 run through the three air inlet openings 11, 13 and 31 and further downwards in the direction of the air filter 7 likewise included in this cross-sectional illustration and its air inlet surface 21. The air filter is arranged further forwards than the section plane A-A in the direction of travel F, but has not been inserted in this illustration either for clarity. The two longitudinal struts 24 and 25 of the rear frame 6 consisting of metal can likewise be seen in the section plane.

It is clear that the air flows 15, 16 and 17, after having passed the edge regions 22 of the side spoilers 3 and 19, have to run downwards in a curve of up to 90° in order to be able to pass through the air inlet openings 11, 13 and 31. A large proportion of the air entering the interior of the air guidance device 9 passes along the flow path 16 to the air inlet surface 21 of the air filter element 7.

Figure 5:
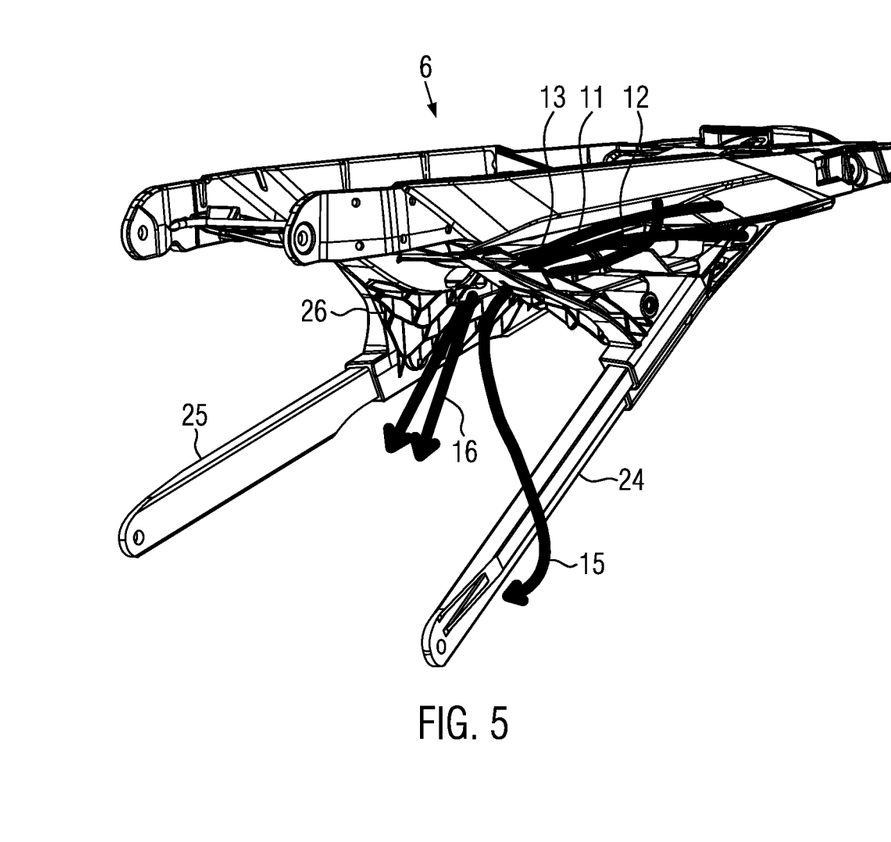
FIG. 5 shows a perspective illustration of a rear frame.

FIG. 5 shows only the rear frame 6 with air inlet openings 11 and 12 through which air passes along the flow path 15 into the interior of the air guidance device 9.

Figure 9:
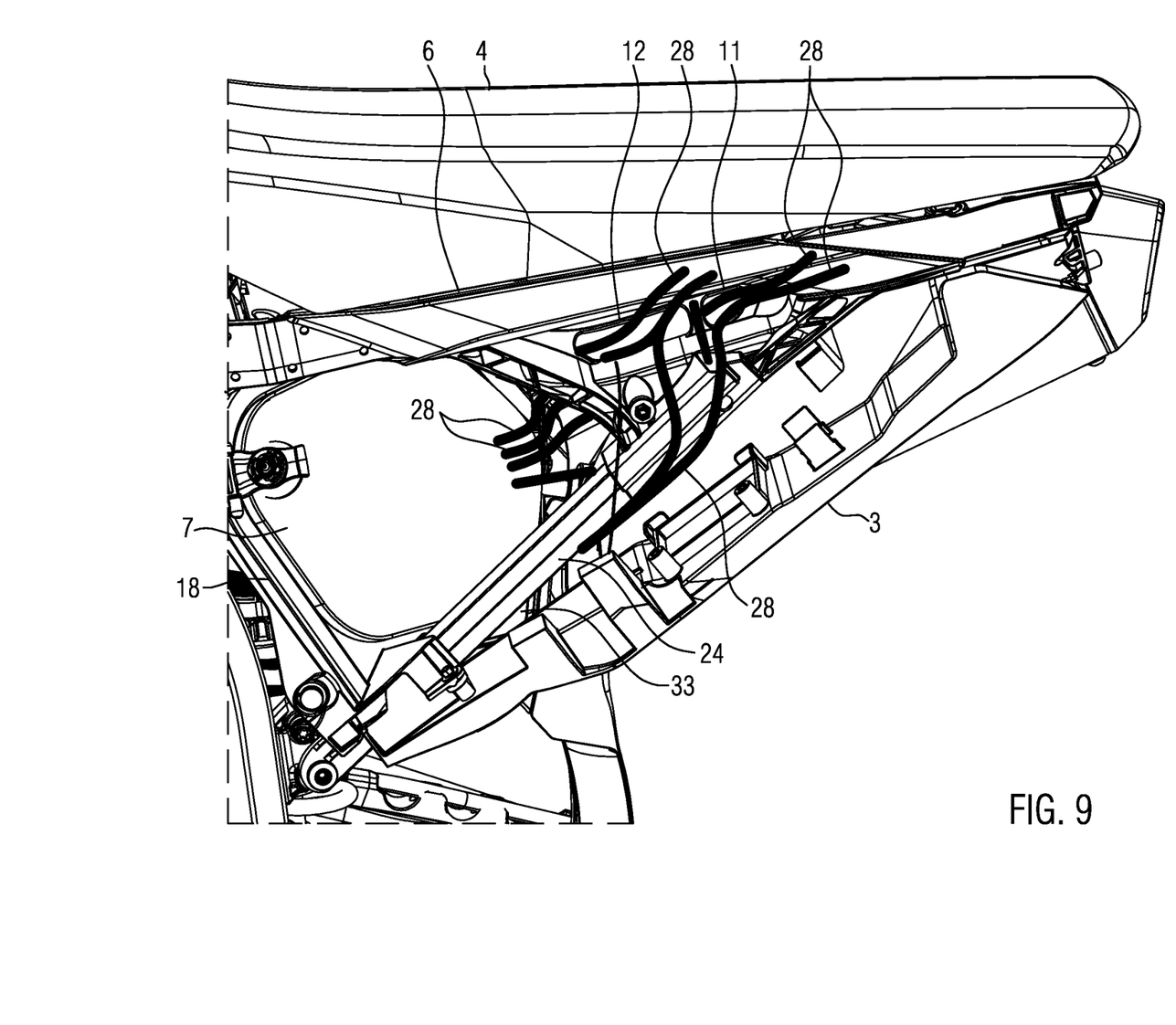
FIG. 9 shows an illustration similar to FIG. 7 to explain the guidance of the intake air in the air guidance device.

FIG. 9 is an illustration similar to FIG. 7 which clearly shows how air passes along the flow lines 28 by entering into the air inlet openings 11 and 12 to the air filter 7. Also recognizable is the outlet opening 33 arranged at the lowest point of the air guidance device 9, the function thereof being clarified below in connection with FIG. 11.

Figure 10:
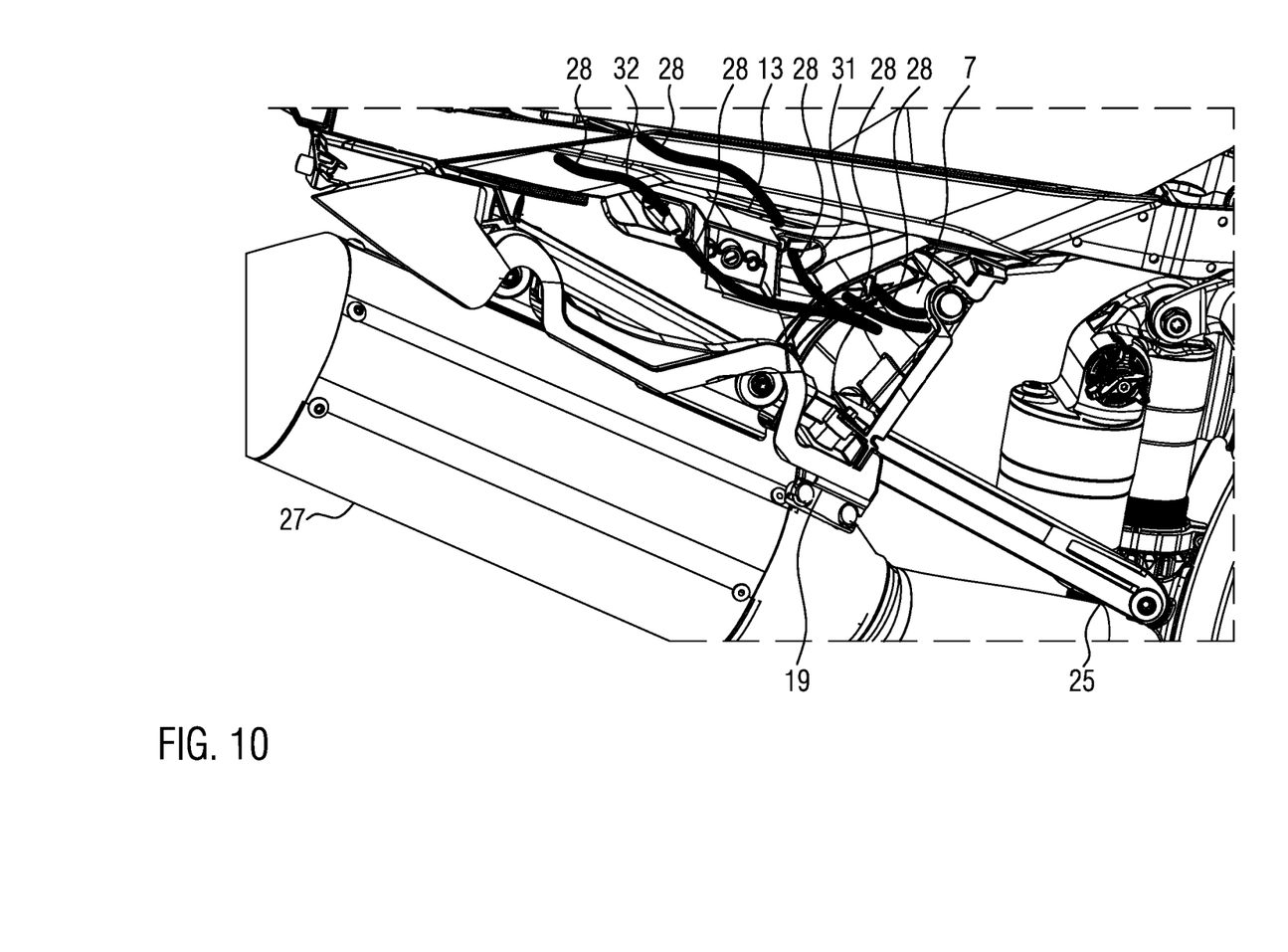
FIG. 10 shows a view of the air guidance device in longitudinal cross section from the right-hand side of the motorcycle.

FIG. 10 is an illustration similar to FIG. 8 which shows how air passes along the flow lines 28 through the air inlet openings 13, 31 and 32 to the air filter 7.

Figure 11:
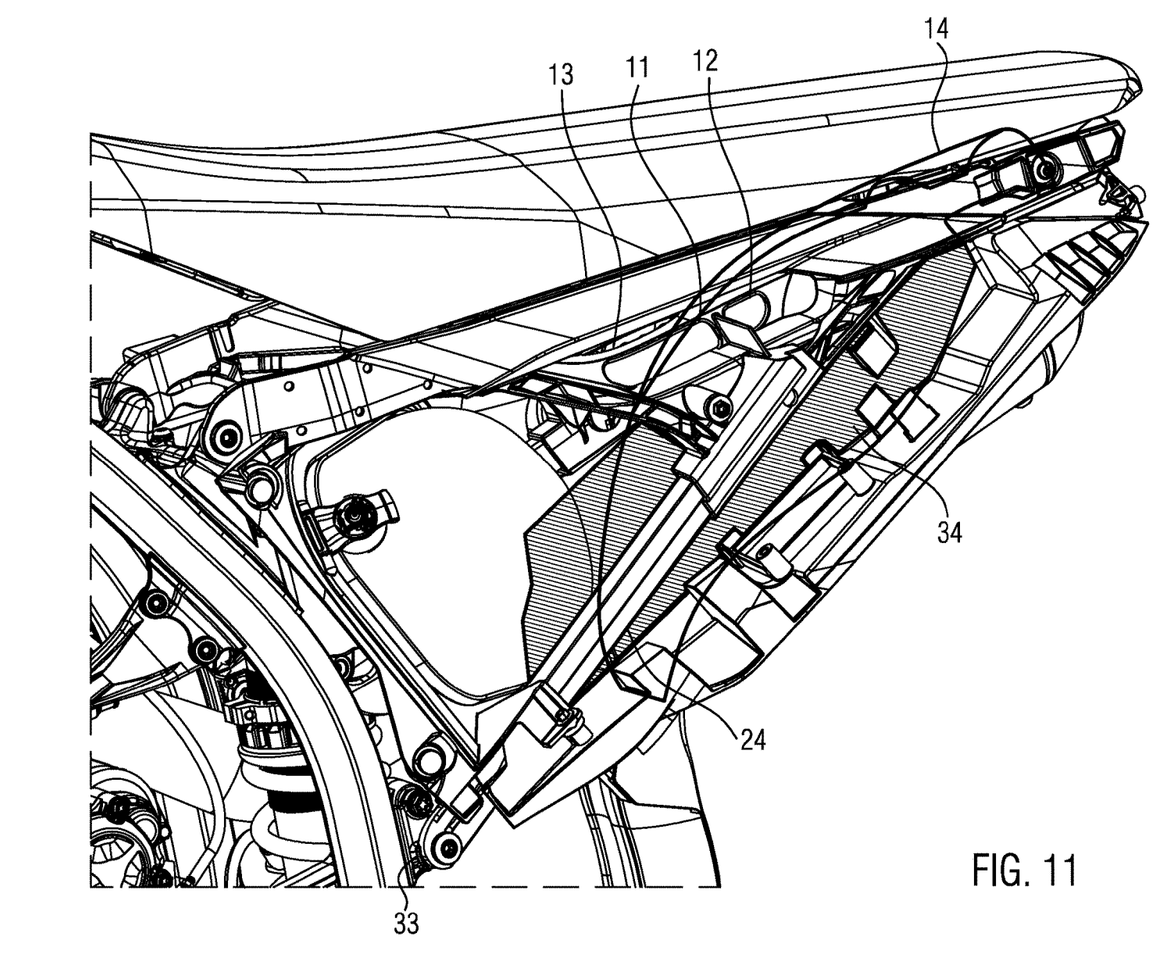
FIG. 11 shows a view of the air guidance device in longitudinal cross section from the front left-hand side of the motorcycle.

FIG. 11 illustrates that particulates and water droplets which do not move along the flow lines 28 in the above two figures owing to their higher density mainly precipitate onto an impingement surface 34 and, through gravity, slide or run off forwards and downwards along this impingement surface 34 and so reach the outlet opening 33 (see FIG. 9). Also shown are the outlines of the fender 14 from which particulates and water droplets pass in the direction of the impingement surface 34 through gravity.

It is clear from these illustrations that a considerable advantage of the invention consists in the fact that, unlike the arrangement of the slot-shaped air inlet openings in the side spoilers in known models, in the arrangement described here, with an air inlet opening running in a transverse direction close to the longitudinal median plane of the motorcycle, a less significant deflection of the air flow is required inside the air guidance device 9. Owing to the arrangement of the air inlet openings 11, 12, 13, 31 and 32 close to the longitudinal median plane of the motorcycle, a deflection in the course of the air flows by approximately 90° from the direction of travel in the horizontal plane already takes place when the air enters the air inlet openings or air inlet surfaces also shaped as grip openings for the user of the motorcycle. A second deflection of the air then takes place in the plane formed by the vertical direction and direction of travel likewise by an angle of approximately 90° when the air enters the air inlet opening 13 which is located in the middle and may be the largest of the five air inlet openings described in this description.

As already mentioned at the beginning, in known motorcycles, use is made of a slot-shaped air inlet opening which is often arranged in the left-hand side spoiler. Located inside the air guidance unit is the air filter element arranged on the front side of the air guidance unit since this side faces towards the engine. The air inlet opening in these motorcycles therefore has to be arranged behind the air filter element in the air guidance unit when viewed in the direction of travel.

Since a slot-shaped air inlet opening is possible arranged in a plane aligned perpendicularly to the direction of travel in order to be able to take the largest possible quantity of air, and since the air flows towards the air guidance unit substantially in the direction of travel, a change in the direction of flow by approximately 180° is required inside the air guidance unit. This arrangement has two disadvantages.

On the one hand, with such a large change of direction, a particularly large quantity of dirt particles and water droplets precipitate out of the air flow. On the other hand, this precipitation takes place inside the air guidance unit.

In contrast, as can be seen from the above illustration, in the present invention, the air flow is already deflected by approximately 90° in a transverse direction outside the air guidance unit 9 of the motorcycle 1 according to the invention. This deflection takes place on the side spoiler, that is to say outside the air guidance unit 9 at a considerable distance from the air inlet openings, in particular the air inlet opening 13. Many dirt particles and water droplets therefore already precipitate out of the air flow at this point. The air inlet openings in the configuration of the motorcycle according to the invention are also located well above the region of the arrangement of the air inlet opening of the known motorcycle when viewed in the direction of the vertical axis of the motorcycle. As a result, the loading of the intake air with dust, sand or dirt particles which are kicked up by the rear wheel of the motorcycle and which can reach into the region of the air inlet openings of the motorcycle equipped according to the invention is significantly reduced.

A further deflection by approximately 90°, this time approximately in the vertical direction, takes place for a considerable proportion of the air flow close to the longitudinal median plane of the motorcycle 1 inside the recess 8 above the air inlet opening 13. In this downwards deflection, many particulates and water droplets again precipitate out of the air flow. Since the air flow has a speed component transversely to the direction of travel at this point, only a few of the particulates and water droplets carried along and precipitating out at this point pass downwards into the air guidance device 9. A large proportion of particulates and water droplets therefore land in the edge regions 22 of the side spoilers 3 and 19.

This illustration clearly shows that, in the motorcycle 1 according to the invention, the impingement of particulates and water droplets onto the air filter element 7 arranged inside the air guidance unit 9 is considerably reduced compared to earlier models. It is therefore possible for the motorcycle 1 according to the invention to be used over longer distances and for longer periods than earlier models without the air filter element 7 having to be cleaned or replaced.

A further advantage of the arrangement of the motorcycle 1 shown here consists in the fact that a significant proportion of the air flow passes along the flow path 16 shown in FIG. 4 from the air inlet openings 11, 12, 13, 31 and 32 almost straight over a short distance to the inlet surface 21 of the air filter element.

Only a small proportion of the air supplied from the air inlet openings follows the flow paths 15 and 17 in order to reach the edge regions, that is to say the regions close to the holding device 18, the air inlet surface 21 of the dome-shaped air filter element 7 made of foam. Unlike earlier models, for example, the formation of a vortex inside the air guidance device 9 is reduced by dispensing with the deflection by approximately 180°. This contributes further to the efficiency of the air supply to the engine.

By virtue of the configuration described, the motorcycle according to the invention achieves a significantly larger air mass flow than known motorcycles, this air mass flow being able to reach the air filter through the air inlet openings provided according to the invention. As a result, the supply of intake air to the internal combustion engine of the motorcycle according to the invention is significantly improved and it has been found that, as a result, the responsiveness of the internal combustion engine of the motorcycle according to the invention is considerably improved, the internal combustion engine therefore reacting much faster to a rapid increase in the throttle valve cross section of the combustion engine provided with the throttle valve device, that is to say with a much faster build-up of the output torque provided by the internal combustion engine.

With respect to features of the invention not explained in more detail above, reference is also expressly made to the patent claims and the drawings.

LIST OF REFERENCE NUMERALS

1. Motorcycle
2. Internal combustion engine
3. Left-hand side spoiler or panel
4. Seat
5. Gap in the side spoiler or panel
6. Rear frame
7. Air filter element
8. Recess in the rear frame
9. Air guidance device 10. Interior
11. Front left-hand air inlet opening
12. Back left-hand air inlet opening
13. Middle air inlet opening
14. Fender or mudguard
15. Air flow
16. Air flow
17. Air flow
18. Holding device
19. Right-hand side spoiler or panel
20. Frame
21. Air inlet surface of the air filter element
22. Edge region
23. Cover element
24 Left-hand rear frame side member
25. Right-hand rear frame side member
26. Rear frame part made of plastic
27. Exhaust
28. Air flow
29. Grip opening
31. Front right-hand air inlet opening
32. Rear right-hand air inlet opening
33. Outlet opening
34. Impingement surface
A: Section plane
F: Direction of travel
H: Vertical direction

What is claimed is:

1. A motorcycle having an internal combustion engine and an air intake device for the internal combustion engine, with an air guidance device for guiding intake air for combustion in the direction of an air filter element arranged in the air guidance device, the air guidance device provided with a holding device holding the air filter element, with a rear cover element which forms a fender of the motorcycle, and with sections of the motorcycle frame having a rear frame defining at least one air inlet opening at a recess of the rear frame, wherein: a left-hand side spoiler and a right-hand side spoiler of the motorcycle form the air guidance device, thereby dispensing with a separate housing for forming the air guidance device; the at least one air inlet opening of the air guidance device of the motorcycle is arranged transversely to a direction of travel and penetrates through the rear frame; and wherein the at least one air inlet opening is arranged transversely to the direction of travel behind gaps in at least one of the side spoiler and at the same height as or lower than an upper edge of at least one of the side spoiler at the respective gap; and wherein the recess and the gaps are shaped as a grip opening.

2. The motorcycle according to claim 1, wherein the at least one air inlet opening is arranged in a part of the rear frame.

3. The motorcycle according to claim 2, in which the air filter element is arranged in the air guidance device.

4. The motorcycle according to claim 3, wherein the air guidance device is provided such that the recess in the rear frame is arranged behind gaps in the side spoiler when viewed transversely to the direction of travel, and wherein a flow path of air, taken in from at least one of the gaps through the recess to the at least one air inlet opening, is curved.

5. The motorcycle according to claim 4, wherein the air guidance device has, at its lowest point, an outlet opening for water and particulates.

6. The motorcycle according to claim 5, wherein the rear frame has the recess arranged transversely to the direction of travel and penetrating through the rear frame, so that the recess forms, together with the gaps in the side spoilers, a grip opening, and wherein the at least one air inlet opening is arranged at the recess.

7. A motorcycle according to claim 1, wherein each side spoiler has a gap and wherein each side spoiler has an edge region which protrudes into the recess on the underside of the recess.

8. The motorcycle according to claim 7, wherein the side spoilers are configured in multiple parts.

* * * * *